(12) United States Patent
Hennenfent

(10) Patent No.: US 9,541,427 B2
(45) Date of Patent: Jan. 10, 2017

(54) METHOD AND APPARATUS FOR PLACING ONE OBJECT AROUND ANOTHER OBJECT, DEVICE FOR HOLDING OBJECTS AND SOFTWARE APPLICATION RELATED TO THE SAME

(71) Applicant: Bradley Richard Hennenfent, Sebring, FL (US)

(72) Inventor: Bradley Richard Hennenfent, Sebring, FL (US)

( * ) Notice: Subject to any disclaimer, the term of this patent is extended or adjusted under 35 U.S.C. 154(b) by 350 days.

(21) Appl. No.: 13/864,170

(22) Filed: Apr. 16, 2013

(65) Prior Publication Data

US 2013/0269594 A1 Oct. 17, 2013

Related U.S. Application Data

(60) Provisional application No. 61/624,616, filed on Apr. 16, 2012, provisional application No. 61/775,264, filed on Mar. 8, 2013, provisional application No. 61/780,966, filed on Mar. 13, 2013.

(51) Int. Cl.
| | | |
|---|---|---|
| *G01D 7/00* | (2006.01) | |
| *G09F 7/10* | (2006.01) | |
| *G09F 11/00* | (2006.01) | |
| *A61J 7/04* | (2006.01) | |

(52) U.S. Cl.
CPC .............. *G01D 7/007* (2013.01); *G09F 7/10* (2013.01); *G09F 11/00* (2013.01); *A61J 7/04* (2013.01)

(58) Field of Classification Search
CPC ............ F16B 9/026; G01D 7/007; G09F 7/10; G09F 11/00; A61J 7/04
USPC .................. 434/203; 116/323, 308, 321, 324
See application file for complete search history.

(56) References Cited

U.S. PATENT DOCUMENTS

| | | | | |
|---|---|---|---|---|
| 2,215,331 | A * | 9/1940 | Marsh ........................... | 248/251 |
| 4,993,952 | A * | 2/1991 | Yeh ......................... | G09B 19/02 |
| | | | | 434/191 |
| 5,331,919 | A * | 7/1994 | Root et al. ..................... | 116/323 |
| 5,915,854 | A * | 6/1999 | Burke et al. .................... | 40/491 |
| 6,375,468 | B1 * | 4/2002 | Sundararajan ................ | 434/203 |
| 2009/0162816 | A1 * | 6/2009 | Charles ......................... | 434/127 |

OTHER PUBLICATIONS

Non-Patent Literature Counting Frame, archived on Feb. 20, 2010 at http://web.archive.org/web/2010020155654/http://www.greyolltwit.com/cframe.html.*

* cited by examiner

*Primary Examiner* — Laura Martin
*Assistant Examiner* — Irving A Campbell
(74) *Attorney, Agent, or Firm* — Dunlap Bennett & Ludwig PLLC

(57) ABSTRACT

A bead design allows the bead to be removably attached to a rail, allowing the bead to slide along the rail without coming off. The rail can be part of a bracket system to hang the rail in various desired locations. The beads can be made in various shapes and sizes, or with various textual indicators, to provide a user with a memory aid. A user can, for example, have a bead for each medicine dose they are required to take. A user can slide the bead to one side when the medicine is taken. Each bead can include an indicator, for example, 6 am, 2 pm, 10 pm that indicates a medicine to be taken 3 times a day. The beads can be used for other reminders and can be designed accordingly. A software application can be designed to mimic the bead and rail system.

9 Claims, 3 Drawing Sheets

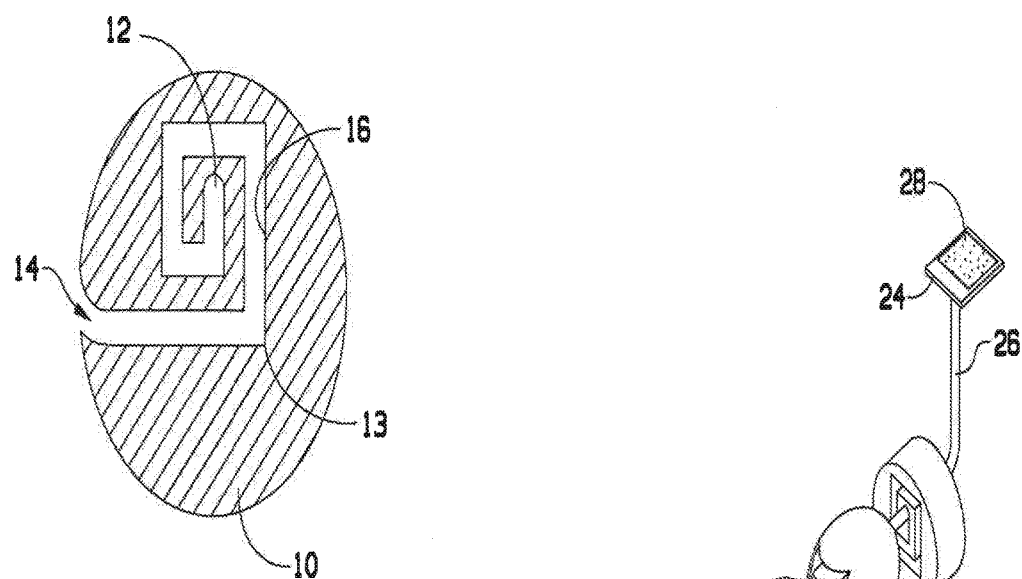
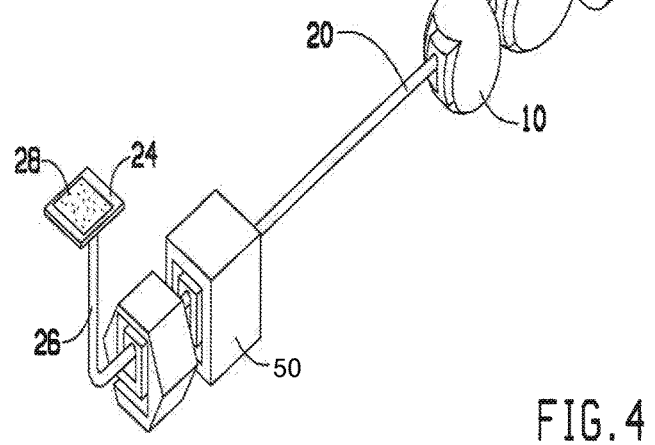

METHOD AND APPARATUS FOR PLACING ONE OBJECT AROUND ANOTHER OBJECT, DEVICE FOR HOLDING OBJECTS AND SOFTWARE APPLICATION RELATED TO THE SAME

CROSS-REFERENCE TO RELATED APPLICATION

This application claims the benefit of priority of U.S. provisional application No. 61/624,616, filed Apr. 16, 2012, U.S. provisional application No. 61/775,264, filed Mar. 8, 2013, and U.S. provisional application No. 61/780,966, filed Mar. 13, 2013, the contents from each of which are herein incorporated by reference.

BACKGROUND OF THE INVENTION

The present invention relates to methods and apparatus for placing one object around another object, a device for holding the objects, and a software application providing an electronic version of the device. The device can be used as, for example, a reminder tool.

Medications are taken by many people around the world. Often, medications are required to be taken a certain number of times a day, over a certain number of days (or even throughout one's lifetime). People can easily forget to take their medications or not remember which medications were taken at which time.

To address this problem, pill boxes with separate containers for the days of the week have been designed. While this can be helpful, a user must pre-fill the pill boxes to make them useful. Sometimes, the pills do not fit into the boxes, or are liquid and must be stored elsewhere, or the pills have to be taken different times of the days, so a single (or two boxes for one day) box is not adequate to remind a user of all the pills that they must take.

In addition to medications, there may be other situations where a user needs a reminder to do a certain task regularly. This could include things like watering plants, feeding pets, doing exercises, or the like.

As can be seen, there is a need for a device that can be used to remind people to perform certain tasks as well as a simple method to customize the device to a user's needs. Moreover, there is a need to provide a software solution that performs a function similar to the device.

SUMMARY OF THE INVENTION

In one aspect of the present invention, an apparatus for indicating a status of one or more tasks comprises at least one rail; and an object slidable along the rail, the object being placed on the rail without the need to slide the object onto the rail from an end thereof, wherein the object represents one of the one or more tasks and sliding the object from one side of the rail to the other side indicates the status of the task.

In another aspect of the present invention, an apparatus for indicating a status of one or more tasks comprises at least one rail attachable to a mounting surface; an object slidable along the rail; a slot communicating with an exterior of the object, the slot sized to receive the rail therein, the slot including one or more angles to prevent the object from falling off the rail; and a terminus of the slot that is not located at a center of gravity of the object, wherein the object represents one of the one or more tasks and sliding the object from one side of the rail to the other side indicates the status of the task.

In a further aspect of the present invention, a computing device having an application disposed therein on a non-transient computer readable media, the application including program code for indicating a status of one or more tasks, the application providing at least one rail displayed on a screen; and an object slidable along the rail, wherein the object represents one of the one or more tasks and sliding the object from one side of the rail to the other side indicates the status of the task.

These and other features, aspects and advantages of the present invention will become better understood with reference to the following drawings, description and claims.

BRIEF DESCRIPTION OF THE DRAWINGS

FIG. 3 is a cross-sectional view of a bead, or other hanging object, designed to be removably affixed to an object, such as the brackets of FIGS. 1 and 2, for example;

FIG. 4 is a perspective view of the bracket of FIG. 1 having a plurality of the beads of FIG. 3 disposed thereupon.

DETAILED DESCRIPTION OF THE INVENTION

Figure 1:
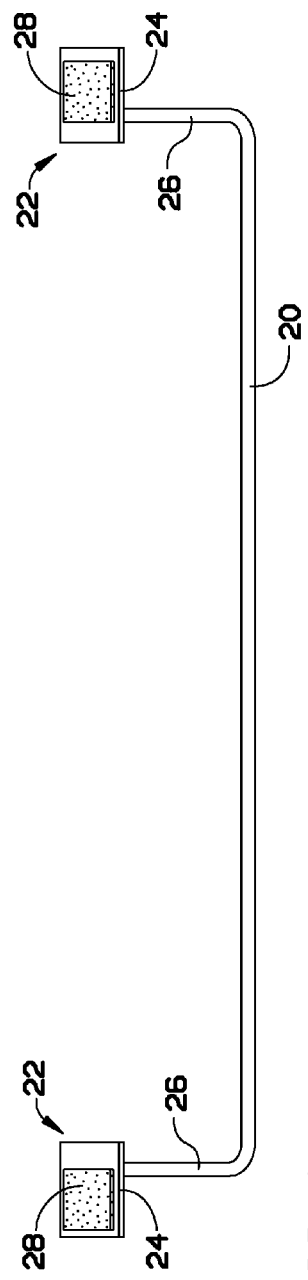
FIG. 1 is a perspective view of a bracket according to an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a bead design, or hanging object, that allows the bead to be removably attached to a rail, allowing the bead to slide along the rail without coming off. The rail can be part of a bracket system to hang the rail in various desired locations. The beads can be made in various shapes and sizes, or with various textual indicators, to provide a user with a memory aid. A user can, for example, have a bead for each medicine dose they are required to take. A user can slide the bead to one side when the medicine is taken. Each bead can include an indicator label 50, for example, 6 am, 2 pm, 10 pm that indicates a medicine to be taken 3 times a day. The beads can be used for other reminders and can be designed accordingly. A software application can be designed to mimic the bead and rail system.

Referring to FIGS. 1 through 4, a tortuous slot 14 can be created in an object, such as a bead 10, so that it will hang on another object, such as a rod 20, wire, rail, or the like, and will not come off, even when slid from side to side. The slot 14 allows placement of the bead 10 on the rail 20 without having to be threaded on the rail 20 from the end and without having to remove other beads from the rail 20 if placing the desired object in between beads. While the Figures show the rail 20 as being a straight rail, the rail 20 could have a slight hump, curve, bend, or the like along the length of the rail, such as at the middle of the rail. This hump, curve, bend, or the like would help keep the sliding objects on one side or the other, especially if the rail is mounted on a swinging object, such as a refrigerator door.

The tortuous slot 14 not only makes it easy to add or remove an object that is hung or placed around another object (such as a rail, wire, rod or the like), it also has features that help prevent the object from spinning off. The slot 14 can be created so that the object hangs off center and in a desired orientation. This more stable orientation will, in turn, allow for labeling of objects with indicator labels 50, if desired. This can be done by having a terminus 12 of the slot 14 to be offset from a center of gravity of the bead 10.

The object can be a bead or some other similar object. While FIG. 3 shows the object as being round, it can be designed in various shapes with various exterior patterns, colors, text, or the like. The slot 14 can be cut, from the outside of the bead 10. The slot 14 can include bends and angles 13 and the terminus 12 of the slot 14 can be designed off center with regards to the center of gravity of the bead 10, in order to make the object hang in a certain position. This can be useful for causing indicator labels 50 with text or images on the bead 10 to be oriented in a desired position.

While FIG. 3 shows the slot 14 as being smooth, the slot 14 could include other angles, bumps, lips or the like. In some embodiments, the slot 14 can include an increased friction coating 16. These features can help increase friction to help prevent the bead 10 from moving from its desired position.

Having an object or many objects of the present invention would enable such objects on a rail 20 to be used for various purposes. The objects could be used for doing math, as in beads on an abacus, as a memory aid, a task reminder, for ornamentation, for artwork, for toys and games, or the like. The beads 10 can also be designed to be used, not on a rail, but in other environments. For example, the beads 10 can be used as jewelry, allowing the user to easily remove or add pieces without the need to remove separate the ends of a chain and thread the bead on the chain.

Referring back to FIGS. 1 and 2, the bead 10 can hang on a rail 20. The rail can be supported at both ends by support brackets 22. A base 24 of the support bracket 22 can be attached to a mounting surface 30 (such as under a cabinet, on a wall, or the like), and a riser 26 of the support bracket 22 can attach to both ends of the rail 20. The riser 26 can separate the rail 20 from the mounting surface so that the beads 10 can be easily applied to the rail 20 and moved as desired.

In some embodiments, the base 24 can be attached to the mounting surface with an adhesive 28. This adhesive 28 may be designed to be removed from the mounting surface without causing damage thereto. Various adhesives, such as 3M brand adhesive strips, can be used to satisfy this purpose. In some embodiments, other attachment mechanisms could be used, such as magnets, suction cups, or the like. In still other embodiments, the support brackets 22 for the rail 20 could simply rest on a surface or be attached to legs, a stand, or the like.

Figure 2:
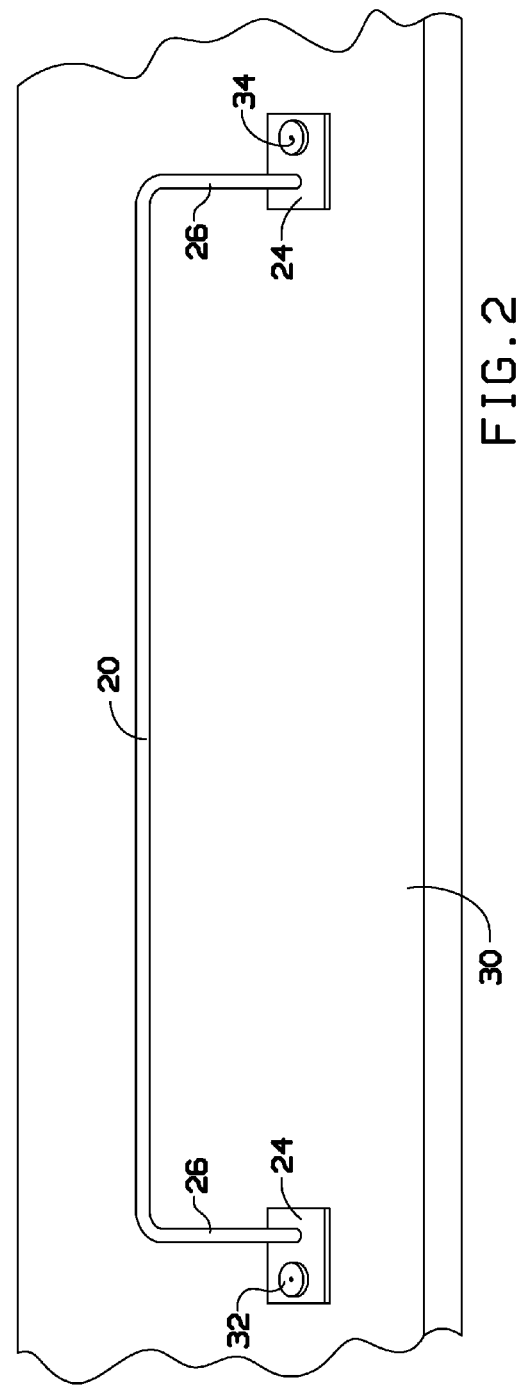
FIG. 2 is a perspective view of a bracket having a screw starting design according to an exemplary embodiment of the present invention.

In some embodiments, the base 24 can be attached to the mounting surface 30 with screws. As shown in FIG. 2, a screw holder 32 can be attached to the base 24, opposite the surface of the base that is mounted on the mounting surface 30. The screw holder 32 can have a hole 34 formed therein to permit a user to insert and secure a screw (not shown) therein. This can help a user start the screw, especially when mounting under a cabinet or the like.

While the Figures and the above discussion refers to the rail 20, the rail 20 could be practically any elongated object that the hanging object (such as the bead 10) can be placed thereupon. A string, rope, wire, or other mostly horizontal elongated object could be used in place of the rail 20.

FIG. 4 shows how multiple beads 10 can be disposed on the rail 20 to allow the beads 10 to be slid therealong. This can be used, as discussed above, for various purposes, such as a task reminder.

Figure 5:
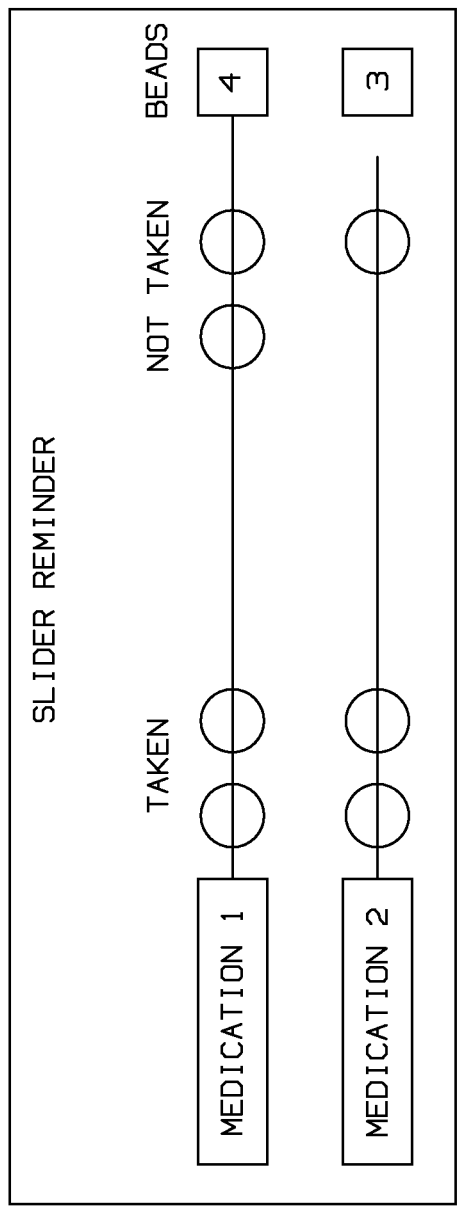
FIG. 5 is a view of an exemplary screen shot of a software application mimicking the device of FIG. 4.

In some embodiments, the system shown physically in FIG. 4 can be incorporated into a software application that can be used on various computer systems, such as desktop computers, laptop computers, tablet computers or smartphones (such as iOS- or Android-based smartphones). The software application can allow a user to set up their rail (or multiple rails, as shown in FIG. 5) and one or more beads disposed along the rail. The user can add text, images, or colors to the beads to help serve as the appropriate reminder.

The application can indicate a status of the beads on the rail, and thus, aid one's memory. The application can indicate what needs to be remembered versus what has been remembered, or what has been done versus what has not been done. Objects representing what should be remembered can be moved from one position to another position when the "should be remembered" item has been remembered, finished, done or accomplished.

The movable objects (such as beads 10), in the software application or the physical application, can be blocks, beads, pills, icons or other sliding objects that can be formed in various shapes, sizes and colors. The objects could be, for example, shaped like pills or some other object to indicate a task that needs to be remembered or performed.

The objects can be set up for daily, weekly, monthly, or some other period for reminders. The object can change color or include some other indicator when they are slid from one side to the other.

As shown in FIG. 5, multiple rails can be provided, for example, for medication 1 and medication 2 in this example. The user may be able to provide any such identification for each desired rail. An indicator can be provided to show how many beads are on each rail and a heading can be provided for each side, such as "taken" and "not taken". When medication 1 is taken, the user can slide the virtual bead from the not taken side to the taken side. This way, when the user opens the application, then can easily see how many of medication 1 they have taken for that day. The headings can be customized by the user, as desired.

It should be understood, of course, that the foregoing relates to exemplary embodiments of the invention and that modifications may be made without departing from the spirit and scope of the invention as set forth in the following claims.

What is claimed is:

1. An apparatus comprising:
   at least one rail; and
   an object having a slot so that the object is slidable along each rail without the need to slide the object onto said rail from an end thereof,
   and
   wherein the slot communicates with an exterior of the object, and wherein the slot includes at least five angles.

2. The apparatus of claim 1, wherein the object is a bead.

3. The apparatus of claim 1, further comprising an increased friction coating on the slot.

4. The apparatus of claim 1, further comprising at least one indicator label disposed along the exterior of the object.

5. An apparatus, comprising:
   at least one rail attachable to a mounting surface;
   an object having a slot so that the object is slidable along each rail; and
   a slot communicating with an exterior of the object, the slot sized to receive the rail therein, the slot including at least five angles.

6. The apparatus of claim 5, wherein the rail is attached to a mounting device at each end thereof, the mounting device having a base attachable to the mounting surface.

7. The apparatus of claim 6, wherein the base is attached to the mounting surface with a removable adhesive.

8. The apparatus of claim 6, wherein the base is attached to the mounting surface with screws.

9. The apparatus of claim 8, further comprising a screw holder, attached to the base, having a hole formed therein, the hole securing the screw prior to tightening onto the mounting surface.

\* \* \* \* \*